(12) United States Patent
DiNardo et al.

(10) Patent No.: US 6,733,719 B2
(45) Date of Patent: May 11, 2004

(54) POLYPROPYLENE BIAXIALLY ORIENTED FILM

(75) Inventors: Victor M. DiNardo, Monroeville, PA (US); Nicholas Z. Karnavas, Pittsburgh, PA (US)

(73) Assignee: Sunoco Inc. (R&M), Philadelphia, PA (US)

( * ) Notice: Subject to any disclaimer, the term of this patent is extended or adjusted under 35 U.S.C. 154(b) by 278 days.

(21) Appl. No.: 10/046,584

(22) Filed: Jan. 14, 2002

(65) Prior Publication Data

US 2003/0151162 A1 Aug. 14, 2003

(51) Int. Cl.$^7$ .............................................. B29C 47/90
(52) U.S. Cl. .................... 264/564; 264/210.6; 264/211; 264/210.7; 264/290.2
(58) Field of Search .................... 264/564, 210.6, 264/211, 210.7, 290.2

(56) References Cited

U.S. PATENT DOCUMENTS

| | | |
|---|---|---|
| 3,555,604 A | 1/1971 | Oahika |
| 4,298,718 A | 11/1981 | Mayr et al. |
| 4,514,534 A | 4/1985 | DiNardo |
| 4,544,717 A | 10/1985 | Mayr et al. |
| 4,701,432 A | 10/1987 | Welborn, Jr. |
| 4,794,096 A | 12/1988 | Ewen |
| 4,808,561 A | 2/1989 | Welborn, Jr. |
| 4,975,403 A | 12/1990 | Ewen |
| 5,137,973 A | 8/1992 | Khanna et al. |
| 5,300,549 A | 4/1994 | Ward et al. |
| 5,308,811 A | 5/1994 | Suga et al. |
| 5,319,012 A | 6/1994 | Ward et al. |
| 5,444,134 A | 8/1995 | Matsumoto |
| 5,480,932 A | 1/1996 | Kobayashi et al. |
| 5,543,535 A | 8/1996 | Lisowsky |
| 5,573,723 A | 11/1996 | Peiffer et al. |
| 5,837,177 A | 11/1998 | DiNardo et al. |
| 5,856,386 A | 1/1999 | Sakai et al. |
| 6,083,443 A | 7/2000 | Eckart et al. |
| 6,207,093 B1 | 3/2001 | Hanyu et al. |
| 6,291,053 B1 | 9/2001 | Peiffer et al. |
| 6,387,317 B1 * | 5/2002 | Roberts ....................... 264/544 |

* cited by examiner

*Primary Examiner*—Mark Eashoo
(74) *Attorney, Agent, or Firm*—Roberts, Abokhair & Mardula, L.L.C.

(57) ABSTRACT

A method of making a polypropylene product for use in making films and preferably biaxially oriented films and more preferably biaxially oriented films wherein a tenter-frame processing line is employed. The method includes the addition of low concentrations of a nucleating system in a mini-random polypropylene that allows for better processability and improved tensile properties. In one embodiment the nucleating system comprises a blend of a monocarboxylic acid nucleating agent and dicarboxylic acid nucleating agent. The nucleating system is combined with the polypropylene material and the resultant hot melt blend is further processed into biaxially oriented film. Alternately, the hot melt blend is formed into a convenient raw material for later use in a biaxial oriented film production facility. The resulting films possess superior processing and material characteristics.

34 Claims, 3 Drawing Sheets

POLYPROPYLENE BIAXIALLY ORIENTED FILM

BACKGROUND OF THE INVENTION

The present invention relates to polypropylene films and biaxially oriented films with improved properties. Polypropylene produces films that have numerous uses including, for example snack food packaging, cigarette overwrap, electronic components wrapping, packaging tape, and shrink film. The polymers normally employed in the preparation of biaxially oriented films are isotactic homopolymers with high stereoregularity, although on some occasions the use of syndiotactic polymers has been proposed. Also suitable are co-polymers of isotactic polypropylenes with a small content of ethylene (mini-random co-polymers).

Isotactic polypropylene is one of a number of crystalline polymers that can be characterized in terms of the stereoregularity of the polymer chain. Various stereo specific structural relationships denominated primarily in terms of syndiotacticity and isotacticity may be involved in the formation of stereoregular polymers of various monomers.

Isotactic polypropylene is conventionally used in the production of relatively thin films in which the polypropylene is heated and then extruded through dies and subject to biaxial orientation by stressing the film in both a longitudinal direction (referred to as the machine direction) and lateral direction sometimes referred to as the tenter direction.

The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polymers are semi-crystalline and, like the isotactic polymers, are insoluble in xylene. This crystallinity distinguishes both syndiotactic and isotactic polymers from an atactic polymer, which is very low in crystallinity and highly soluble in xylene. An atactic polymer exhibits no regular order of repeating unit configurations in the polymer chain and forms essentially a waxy product.

The isotactic polymers normally employed are typically prepared through the use of conventional Ziegler-Natta catalysts of the type disclosed, for example, in U.S. Pat. Nos. 4,298,718 and 4,544,717, both to Myer et al.

U.S. Pat. No. 5,573,723 to Peiffer discloses a process for producing biaxially oriented polypropylene film based on an isotactic polypropylene homopolymer or propylene ethylene co-polymers.

Catalysts employed in the polymerization of alpha-olefins may be characterized as supported catalysts or unsupported catalysts, sometimes referred to as homogeneous catalysts. Traditional supported catalysts are the so-called "conventional" Ziegler-Natta catalysts, such as titanium tetrachloride supported on an active magnesium dichloride as disclosed, for example, in the aforementioned patents to Myer et al.

Alternative types of catalysts that produce isotactic polyolefins are disclosed in U.S. Pat. Nos. 4,794,096 and 4,975, 403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described, the support may be any support such as talc, an inorganic oxide, or a resinous support material such as a polyolefin. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242, 876 to Shamsoum et al. Various other catalyst systems involving supported metallocene catalysts are disclosed in U.S. Pat. No. 5,308,811 to Suga et al and U.S. Pat. No. 5,444,134 to Matsumoto.

Polypropylene films can be produced by methods known in the art and include biaxially oriented films as well as blown films. The biaxially oriented films are preferably produced in tenter frame processing lines or double bubble processing lines.

Polypropylene compositions which can be oriented at variable process conditions, particularly over a range of machine direction orientation draw ratios and transverse direction orientation oven temperatures, are desirable for a number of reasons. Film manufacturers have the flexibility to vary one or more processing conditions within an acceptable range for a particular film production run. In addition, the possibility of a web break during the orientation process is lessened, resulting in lower processing line start up costs. For example, a standard machine direction orientation draw ratio may be about 5 times the original length of the polyolefin film. A standard transverse direction oven temperature is about 166° C. These processing conditions are considered standard in that the occurrence of web breaks in the film are infrequent.

The ability to orient film compositions under variable conditions, for example a machine direction draw ratio within the range of its standard up to 9 times the original length, and a transverse direction oven temperature within the range of its standard to about 20° C. less than the standard, gives manufacturers greater flexibility. A further processing advantage is the ability to draw the film at higher line speeds thereby decreasing the manufacturing time.

To achieve processabillity at high line speeds metallocene polymers can be blended with the polypropylene in an effort to maintain film properties and gain a wider process window. However, this technique can be a costly means to accomplish both goals.

Biaxially oriented films can have a number of properties to their advantage during and after the machine processing steps. A relatively low coefficient friction is desirable, both during the biaxially orientation procedure and in the use of the ultimately produced biaxially oriented film for end use applications. A relatively high stiffness, as indicated by the tensile modulus in both the machine direction and the transverse direction is usually advantageous. Relatively low permeabilities to gas and water are desirable. In addition, a high shrinkage factor of the processed film, while undesirable in some cases, can be advantageous in others, such as where the film is used in stretch wrapping of food products, electrical components, and the like.

Properties of the resulting film product can be dependent to a certain degree on the particular process conditions under which the polypropylene composition was manufactured. For example, a stiffer film with a higher shrinkage factor and better barrier properties would result from an orientation process incorporating a larger machine direction orientation draw ratio. Likewise, the transverse direction orientation oven temperature would affect the properties of the resulting oriented film product, particularly improving the shrinkage factor.

The physical and optical properties of films are important in the film industry and should fall within certain parameters for different film applications. The optical properties include haze, clarity, and gloss. Haze is a phenomenon of light scattering and arises from local variations in the refractive index. Haze is defined as the relative fraction of scattered intensity from the dispersed particles in all directions, being detected in a range of wide angle, to the incident light intensity. Clarity is a measure of contact clearness or see-through quality and is different from haze due to the direct transmittance of light. For example, some films may indeed be hazy but appear clear as the film is in contact with the contents of a package. Unlike haze, clarity is distance dependent so that the thinner the film, the better the contact clarity. Gloss is defined as the ratio of the reflected light intensity from the film at a specific angle of incidence light to that of a standard with the ideal smooth surface.

Nucleating agents are used to increase the stiffness of processed materials. Nucleating agents may also improve the optical and barrier properties of the resulting materials. Various nucleating agents have been used with polypropylene materials. For example, U.S. Pat. Nos. 5,300,549 and 5,319,012 to Ward et al. (the Ward patents) disclose the use of dicarboxylic and monocarboxylic acids for the subsequent manufacture of shaped articles. U.S. Pat. No. 5,856,386 to Sakai et al. uses rosin acid metallic salts as the nucleating system. The above identified patents are incorporated herein by reference.

Most nucleating agents (sodium benzoate, talc etc.) are particulate in nature, and more specifically, are ground to the appropriate particle size to be used in polyolefins as a nucleating agent. They may have a particle size distribution consisting of a mean size of 2 micron with a top size of 10 micron, for example. Although this is not a problem in converting systems such as molding or thick extrusion (sheet or Pipe), this can be a problem in thin gage film. Most particulate nucleants in film cause the film to break during stretching.

It is difficult to disperse particulate nucleating agents and get effective homogeneous nucleation, even at very low levels. Also, the crystallization characteristics of the nucleated film, in most cases, are so rapid that the film tends to break during orientation of the film, due to the narrow stretch window caused by both the nonuniform dispersion of the agent, and the high rate of crystallization.

To solve this problem, non particulate systems that are compatible with the dynamics of film stretching (slower nucleation rates) need to be used. The nucleating systems disclosed in the Ward patents exemplify some of the non-particulate nucleating systems commercially available.

Nucleating agents can be added directly to molten polypropylene, for example, in a "melt blend" or by other methods known in the art.

The above nucleating systems and methods disclose different concentrations of nucleation agents depending upon the agents selected. The carboxylic acid agents of the Ward patents use exemplified concentrations of 2500–5000 ppm. Rosin acid metallic salts of the Sakai patent were exemplified in concentrations of 3000–9000 ppm.

Surprisingly, it has been discovered that improved polypropylene films and biaxially oriented polypropylene (BOPP) films may be formed using non-particulate nucleating systems in low concentrations with mini-random polypropylene.

It is therefore the object of this invention to provide compositions useful for production of polypropylene films and preferably BOPP film of improved tensile strength comprising mini-random polypropylene and low concentrations of the nucleating agents.

BRIEF SUMMARY OF THE INVENTION

A method of making a mini-random polypropylene product for use in making films and preferably biaxially oriented films and more preferably biaxially oriented films wherein a tenter-frame processing line is employed. The method includes the addition of a nucleating system in a mini-random polypropylene that allows for better processability and improved tensile properties. In one embodiment the nucleating system comprises a blend of a monocarboxylic acid nucleating agent and dicarboxylic acid nucleating agent. The nucleating system is combined with the polypropylene material and the resultant hot melt blend is further processed into biaxially oriented film. Alternately, the hot melt blend is formed into a convenient raw material for later use in a biaxial oriented film production facility. The resulting films possess superior processing and material characteristics.

DETAILED DESCRIPTION OF THE INVENTION

In the present invention, polypropylene polymer suitable for use in biaxially oriented films is produced wherein a nucleating system is combined with a mini-random polypropylene. The resultant composition is particularly well suited for biaxially oriented polypropylene (BOPP) films and has advantages of good stretching, improved tensile strength and low concentrations of nucleating agents (25 to 300 ppm).

The present invention is not limited to any one particular method of processing the composition into BOPP films. However, our preferred method includes first, obtaining extrusion grade mini-random polypropylene in powder or other suitable form. The polypropylene is combined with stabilizers, acid scavengers, antioxidants, acid neutralizers and other additives commonly known and used in the art. The nucleating system is also added. The above are extruded into pellet, or processed into a powder or other suitable form, and the resulting pellets or other physical form are processed into BOPP film as is commonly known in the art. The above composition may also be processed directly into BOPP film by feeding the molten extrudate into the biaxial orientation processing equipment.

As used herein the phrase "convenient raw material" refers to the composition of the present invention, extruded and processed into such solid forms as pellets, powders or other suitable forms that are easily fed into film production facility.

As used herein the term "mini-random polypropylene" refers to isotactic propylene-ethylene copolymers containing less than 2% by weight of ethylene, inserted in a random fashion, and preferably from 0.3% to 1% by weight of ethylene. Typical of the mini-random polypropylene is Sunoco 2.1MF containing approximately 0.5% ethylene and available from Sunoco Chemicals.

As used herein "nucleating system" includes any of those previously described including mono- and dicarboxylic acids and rosin acid metallic salts. As used herein, "non-particulate nucleating system" refers to nucleating systems comprising aliphatic dicarboxylic acids which are used singly or in combination with other dicarboxylic or monocarboxylic acids and that are used in a non-particulate form during nucleation. The non-particulate form can be either due to the nucleating system being in a liquid or solubilized state during the crystallization of the mini-random polypropylene.

As used herein "aliphatic dicarboxylic acids" refers to acyclic organic acids having two carboxylic acid groups and further containing from 4 to 21 carbon atoms and include, by way of example, succinic acid, glutaric acid, adipic acid, pimelic acid, suberic acid, azelaic acid, undecanedioic acid and dodecanedioic acid and mixtures thereof.

As used herein "aliphatic monocarboxylic acids" refers to acyclic organic acids having a single carboxylic acid groups and further containing from containing from 8 to 24 carbon atoms and include, by way of example, oleic acid, stearic acid, behenic acid, myristic acid, pentadecanoic acid, palmitic acid, margaric acid, abietic acid, lauric acid, linoleic acid, ricinoleic acid, dihydroxystearic acid, arachidic acid, eicosenoic acid, erucic acid, tetracosenoic acid, elaidic acid and mixtures thereof. Such acids may be either saturated or partially unsaturated.

Non-particulate nucleating systems are commercially available. For example, the non-particulate nucleating system known as Moldpro™ 931 is available from Witco Chemicals.

The aliphatic acids referenced are commercially available either as relatively pure compounds or as blends. For example, Witco Chemicals makes commercially available a blend of aliphatic monocarboxylic acids known under the trademark Hystrene™ 7018. This blend is reported to comprise a mixture of stearic acid (65%), palmitic acid (29%), myristic acid (3%), margaric acid (2%), pentadecanoic acid (0.5%), and oleic acid (0.5%).

It is important that the resulting film has a relatively even dispersion of nucleating agent, and thus, relatively even nucleation of the polymer film material. This film will also possess good optical properties. Low concentrations and even dispersion of nucleating agents yield polypropylene or a BOPP film having good processing characteristics.

The nucleating system of the present invention will have a concentration of nucleating agent of about 25 to about 300 ppm of the polymer to be processed into film. Preferably, it comprises about 50 to about 200 ppm of the polymer, and most preferably about 100 to about 200 ppm.

In general, film production can be of any suitable technique including the use of tenter frames, blown film processing and double bubble film processing. Of these, the tenter frame and double bubble film processing produce biaxial oriented film while the blown film process results in films of substantially lower orientation.

An example of the use of tenter frames is disclosed in U.S. Pat. No. 6,207,093 to Hanyu et al. As described in the Hanyu et al. patent, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions.

The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment). The film may also be metallized as described in U.S. Pat. No. 4,692,380 to Reid. While corona and flame treatment typically occurs immediately following orientation and prior to the initial roll up, metallizing is typically performed at a separate time and location.

Figure 1:
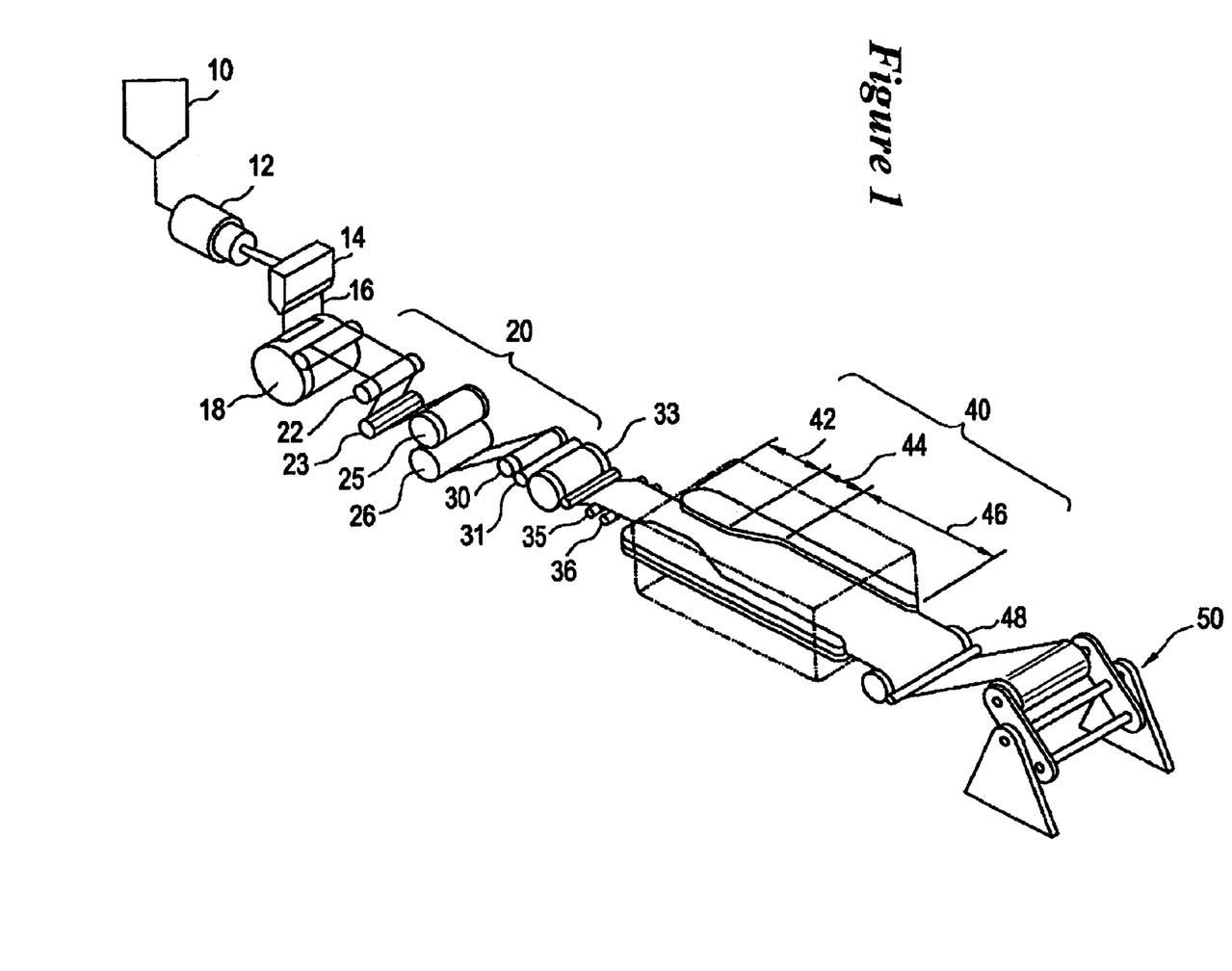
FIG. 1 illustrates a tenter-frame process for producing biaxially oriented polypropylene films.

FIG. 1 illustrates the apparatus described in the Hanyu et al. patent that may be employed in producing biaxially-oriented polypropylene film in accordance with the present invention. In FIG. 1, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and is oriented by fast roller 31 operating at a suitable speed greater than that of the preheat rollers in order to orient the film in the machine direction.

As the oriented film is withdrawn from the fast roller 31, it is passed over a roller 33 at room temperature conditions. From here it is passed over rollers to a lateral stretching section 40 where the film is oriented by stretching in the transverse direction. The section 40 includes a preheat section 42 comprising a plurality of tandem heating rollers (not shown) where it is reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. The concluding portion of the lateral stretching phase includes an annealing section 46, such as an oven housing, where the film is heated at a temperature within the range of 130–170° C. for a suitable period in time. The annealing time helps control certain properties, and increased annealing is often specifically used to reduce shrinkage.

The biaxially oriented film is then withdrawn from the tenter frame and passed over a chill roller 48 where it is reduced to a temperature of less than about 50° C. and then applied to take-up spools on a takeup mechanism 50. Typically, the initial orientation in the machine direction is carried out at a somewhat lower temperature than the orientation in the lateral dimension. For example, the film may be stretched in the machine direction at a temperature of about 120° C. and stretched in the lateral dimension at a temperature of 160° C.

Figure 2:
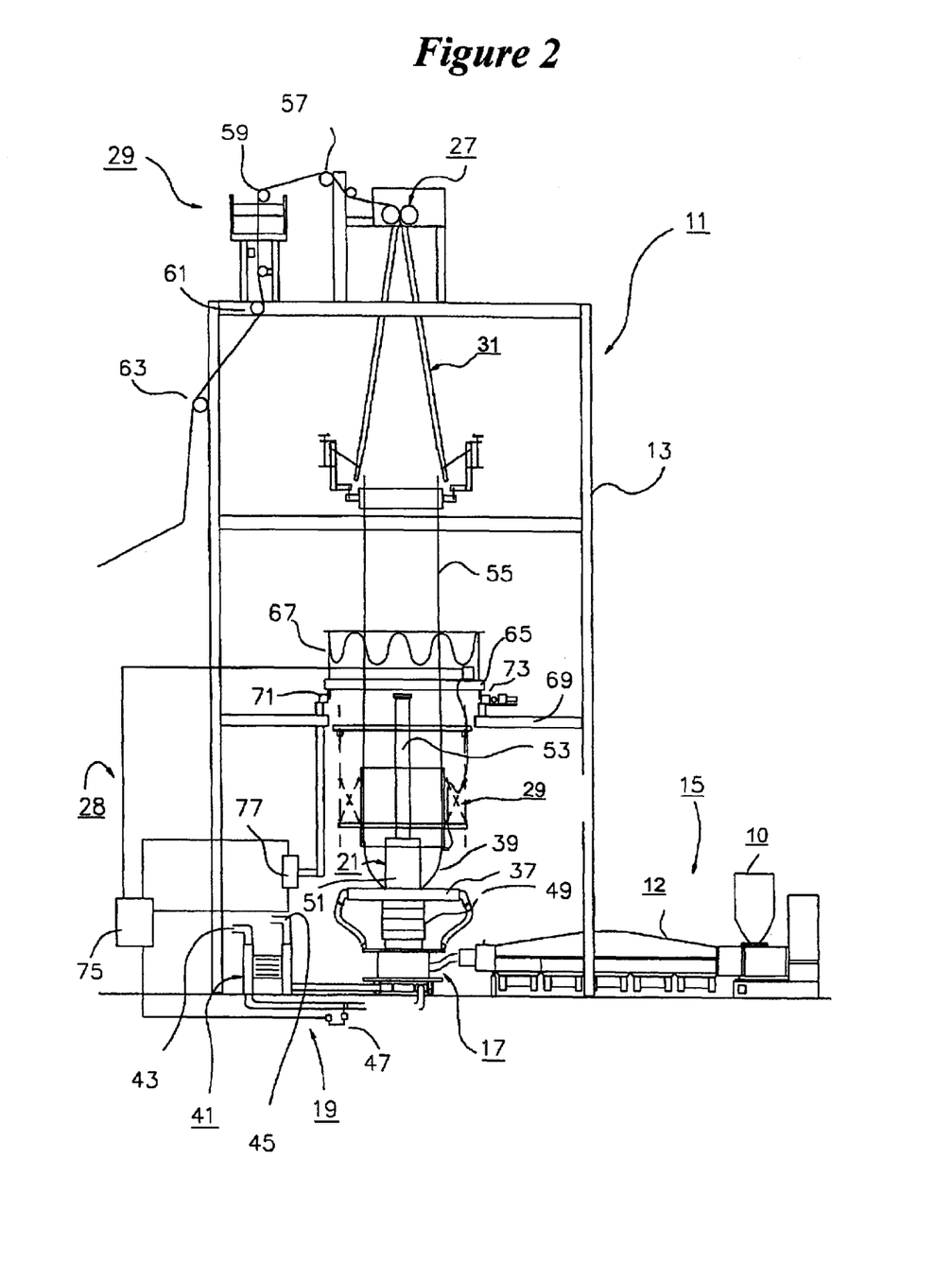
FIG. 2 illustrates a blown-film process for producing polypropylene films.

Polypropylene films are also produced in a blown film processing line as depicted in FIG. 2 and further described in U.S. Pat. No. 5,891,383 to Joseph.

In FIG. 2, the blown film extrusion line 11 includes a number of subassemblies that operate together in the production of plastic film. The main subassemblies include blown film tower 13, which provides a rigid structure for mounting and aligning the various subassemblies, extruder subassembly 15, die subassembly 17, blower subassembly 19, stack 21, sizing cage 29, collapsible frame 31, nips 27, control subassembly 28 and rollers 29.

Plastic granules are fed into hopper 10 of extruder subassembly 15. Plastic granules are melted and fed by extruder 12 and pushed into die subassembly 17, and specifically to annular die 37. The molten plastic granules emerge from annular die 37 as a molten plastic tube 39, which expands from the die diameter to a desired final diameter, which may vary typically between two to three times the die diameter.

Blower subassembly 19 includes a variety of components that act together to provide a flow of cooling air to the interior of molten plastic tube 39, and also along the outer periphery of molten plastic tube 39. Blower subassembly includes blower 41 that pulls air into the system at intake 43, and exhausts air from the system at exhaust 45. The flow of air into molten plastic tube 39 is controlled at valve 47. Air is also directed along the exterior of molten plastic tube from external air ring 49, which is concentric to annular die 37. Air is supplied to the interior of molten plastic tube 39 through internal air diffuser 51. Air is pulled from the interior of molten plastic tube 39 by exhaust stack 53.

The streams of external and internal cooling airs serve to harden molten plastic tube 39 a short distance from annular die 37. The line of demarcation between the molten plastic tube 39 and the hardened plastic tube 55 is identified in the trade as the "frost line." Normally, the frost line is substantially at or about the location at which the molten plastic tube 39 is expanded to the desired final diameter.

In some systems, rotating frame 65 is provided for rotating relative to blown film tower 13. It is particularly useful in rotating mechanical feeler arms of the prior art systems around plastic tube 55 to distribute the deformations. Umbilical cord 67 is provided to allow electrical conductors to be routed to rotating frame 65. Rotating frame 65 rotates at bearings 71, 73 relative to stationary frame 69. Control subassembly 28 is provided to monitor and control the extrusion process, and in particular the circumference of plastic tube 55. Control subassembly 28 includes supervisory control unit, and operator control panel 77.

In many ways the blown film processing line is similar to the initial stage of a double-bubble process that produces biaxially oriented film. Best know is the double-bubble process described in U.S. Pat. No. 3,555,604 to Pahlke and incorporated herein by reference.

Figure 3:
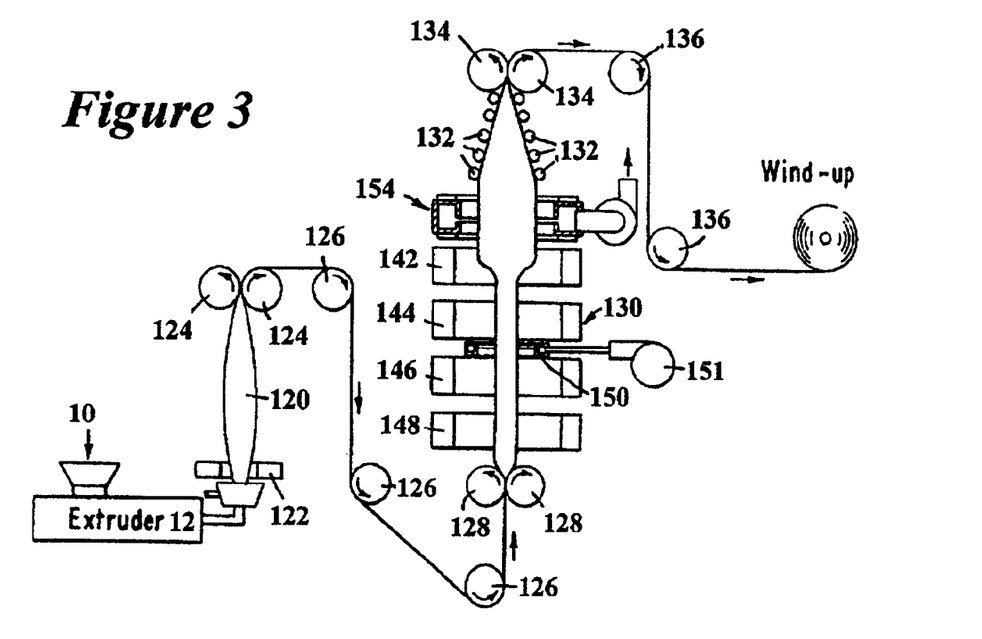
FIG. 3 illustrates a double-bubble process for producing biaxially oriented polypropylene films.

FIG. 3 illustrates the major components of such a double bubble processing line. The plastic feedstock 10 is fed into extruder 12. A primary bubble 120 forms by inflating the bubble as the melt exits die 122. Primary bubble 120 is cooled and collapsed as it passes through rollers 124. The resulting collapsed tube is then re-inflated to form the second bubble. The second bubble is heated to its draw temperature by means of external heaters 148, 146, 144, and 142. The amount of inflation determines the degree of orientation in the transverse direction. Machine direction orientation is imparted by having speed of the exit rollers 134 greater than the inlet rollers 128.

Features required to properly control the double-bubble process are further described in the Pahlke patent. Such features include special design of extruder die 122, air cooling areas 151 and 154 and guide rollers 132.

For the most part the double-bubble process results in a biaxially oriented film that is simultaneously oriented in both the machine and transverse directions. This is in contrast to the tenter frame processing line where first machine direction orientation is followed by transverse (tenter direction) orientation.

Various properties are used to measure the performance of polypropylene compositions and films made therefrom. Described below are some of the methods used.

Crystallization: In a differential scanning calorimeter (DSC), the composition is first melted and then cooled at a constant rate of 10° C./min. The crystallization rate of the composition was determined from the crystallization exothermic peak temperature crystallization temperature (Tc) measured by the DSC. Also determined with the DSC are the melting point (Tm) and crystallization percentage (Cryst %).

Tensile Strength: The tensile strength including stress and elongation at break were measured for samples of produced film by ASTM method D882. Test speed was 2 inch/minute and a jaw separation of 4". ASTM method D882 was similarly used to measure tangent modulus, peak stress, energy to peak load and % elongation at peak. For the latter measurements a test speed of 0.4 inch/minute and a jaw separation of 4" were used.

Biaxially oriented film produced of the various compositions was tested for processability as well optical qualities. One of the processability measures is the natural draw ratio, determined at 280° F. (138° C.). Another measure is the area under the yield/stress curve. Lower area values and higher natural draw ratios indicate greater processibility.

Optical properties were determined on samples stretched to an average thickness of 0.6 mils (15 μm). Optical properties include haze, transmittance and gloss. Haze and luminous transmittance were determined in accordance with ASTM D1003. In general, lower haze films will have higher transmittance. Specular gloss was measured generally in accordance with ASTM D2457. ASTM D2457 refers to measurements at 20, 45 and 65 degrees. In addition, specular gloss was measured at an angle of 85 degrees.

The invention is illustrated, but not limited by the following examples:

EXAMPLE 1

A mini-random polypropylene designated Sunoco 2.1MF and available from Sunoco Chemicals was tested with and without a nucleation system. This polypropylene was selected for its high isotacticity and 0.5% ethylene content, typical of mini-random polypropylene. It has a melt flow index of 3.2 which is typical for mini-random polypropylenes used in film production.

The nucleation system consisted of a blend of aliphatic dicarboxylic and monocarboxylic acids (primarily adipic and stearic acids). The ratio of stearic acid to adipic acid in this nucleation system was in accordance with the ratios of U.S. Pat. Nos. 5,300,549 and 5,319,012. This nucleation blend is commercially available from Witco Chemicals of New York and is typical for a dicarboxylic/monocarboxylic nucleation system (designated Witco Moldpro™ 931). Surprisingly it was found that low concentrations of nucleation system increased tensile strength yet with equal or improved processibility.

Sample A is designated as the mini-random polypropylene without any agents added. Sample B consists of Sample A to which 50 ppm nucleation system is added. Similarly, Sample C consists of Sample A with 100 ppm nucleation system. Finally, Sample D consists of Sample A with 150 ppm nucleation system added.

TABLE 1

Crystallization Properties for Mini-Random Polypropylene and Carboxylic Nucleation System

|  | Melting Temp ° C. | Crystallization Temp ° C. | Crystallization % |
|---|---|---|---|
| Sample A | 158.2 | 112.6 | 62.2 |
| Sample B (50 ppm nucleation) | 158.8 | 116.8 | 63.8 |
| Sample C (100 ppm nucleation) | 159.4 | 118.9 | 63.5 |
| Sample D (150 ppm nucleation) | 159.8 | 120.7 | 61.6 |

Table 1 indicates the results on crystallization properties of the various samples. It is seen that adding the nucleation system enhances temperature stability with increases in both the melting and crystallization temperatures. Crystallization percent increased to a peak at 100 ppm nucleation system, then decreased thereafter. This implies that additional nucleation system is not expected to enhance stability.

TABLE 2

Tensile Strength Properties for Mini-Random Polypropylene and Carboxylic Nucleation System

|  | Break Stress (psi) | Break Elongation (%) | Tangent Modulus (psi) | Peak Stress (psi) | Energy to Peak (in-lb) | Elong. at Peak (%) |
|---|---|---|---|---|---|---|
| Sample A | 30,802 | 75 | 461,366 | 30,830 | 45 | 75 |
| Sample B (50 ppm nucleation) | 31,074 | 67 | 449,914 | 32,324 | 41 | 72 |
| Sample C (100 ppm nucleation) | 31,931 | 72 | 479,703 | 32,324 | 41 | 72 |
| Sample D (150 ppm nucleation) | 31,174 | 72 | 517,842 | 31,471 | 40 | 72 |

Table 2 indicates the results on tensile strength of the various samples. Breaking strength reaches a peak at 100 ppm while tangent modulus continues to increase with increasing nucleation system. Based upon these results, the preferred amount of nucleation system to be added is in the range of 100–150 ppm.

TABLE 3

Processibility Properties for Mini-Random Polypropylene and Carboxylic Nucleation System

|  | Natural Draw Ratio at 280° F. | Yield/Stress Area |
|---|---|---|
| Sample A | 4.11 | 2.52 |
| Sample B (50 ppm nucleation) | 3.97 | 2.57 |
| Sample C (100 ppm nucleation) | 4.26 | 2.60 |
| Sample D (150 ppm nucleation) | 4.21 | 2.44 |

Table 3 indicates the results on processiblity properties of the various samples. Both improved draw ratio and increased ease of processing is seen for Sample D with 150 ppm of nucleation system added.

TABLE 4a

Optical Properties for Films stretched after 25 Seconds of 280° F. preheat - Films of Mini-Random Polypropylene and Carboxylic Nucleation System

|  | Haze | Transmittance | Gloss-20 Degrees | Gloss-45 Degrees | Gloss-60 Degrees | Gloss-85 Degrees |
|---|---|---|---|---|---|---|
| Sample A | 0.46 | 91.95 | 145.7 | 94.2 | 149.3 | 111.9 |
| Sample B (50 ppm nucleation) | 0.80 | 91.68 | 118.7 | 92.2 | 140.6 | 106.5 |
| Sample C (100 ppm nucleation) | 0.73 | 91.64 | 125.7 | 92.0 | 142.5 | 108.0 |
| Sample D (150 ppm nucleation) | 0.61 | 91.78 | 138.4 | 93.1 | 146.8 | 110.8 |

TABLE 4b

Optical Properties for Films stretched after 25 Seconds of 290° F. preheat - Films of Mini-Random Polypropylene and Carboxylic Nucleation System

|  | Haze | Transmittance | Gloss-20 Degrees | Gloss-45 Degrees | Gloss-60 Degrees | Gloss-85 Degrees |
|---|---|---|---|---|---|---|
| Sample A | 0.45 | 91.89 | 140.1 | 93.4 | 146.9 | 110.8 |
| Sample B (50 ppm nucleation) | 1.03 | 91.5 | 114.8 | 90.0 | 137.8 | 106.4 |
| Sample C (100 ppm nucleation) | 0.89 | 91.69 | 126.2 | 91.8 | 140.2 | 108.1 |
| Sample D (150 ppm nucleation) | 0.59 | 91.89 | 139.0 | 92.9 | 146.3 | 110.5 |

TABLE 4c

Optical Properties for Films stretched after 25 Seconds of 300° F. preheat - Films of Mini-Random Polypropylene and Carboxylic Nucleation System

| | Haze | Transmittance | Gloss-20 Degrees | Gloss-45 Degrees | Gloss-60 Degrees | Gloss-85 Degrees |
|---|---|---|---|---|---|---|
| Sample A | 1.71 | 90.88 | 97.7 | 89.1 | 131.2 | 101.8 |
| Sample B (50 ppm nucleation) | 10.44 | 83.94 | 38.7 | 68.7 | 92.7 | 90.6 |
| Sample C (100 ppm nucleation) | 5.43 | 87.64 | 71.4 | 76.3 | 112.2 | 99.0 |
| Sample D (150 ppm nucleation) | 1.65 | 91.06 | 108.9 | 88.3 | 133.5 | 104.5 |

The optical properties of the various samples are given in table's 4a, 4b and 4c. The difference between these tables is the temperature at which biaxial orientation to the films is applied. It is noticed that at the lower concentrations of nucleation optical properties are somewhat diminished. However at the 150 ppm nucleation level, optical properties are virtually identical to those of the untreated mini-random polypropylene.

Although the present invention has been described in terms of specific embodiments, various substitutions of materials and conditions can be made as will be known to those skilled in the art. For example, the nucleation system may be adjusted by using other nucleation agents. Other variations will be apparent to those skilled in the art and are meant to be included herein. The scope of the invention is only to be limited by the following claims:

What is claimed is:

1. A method of making a polypropylene product comprising the steps of:
    (a) providing an extrusion grade mini-random polypropylene;
    (b) combining said extrusion grade polypropylene with a non-particulate nucleation system, to form a composition;
    (c) processing said composition into said product; and
    wherein the concentration of nucleating system is from 25 ppm to 300 ppm.

2. The method of claim 1 wherein said product is a biaxially oriented film.

3. The method of claim 2 wherein the concentration of non-particulate nucleating system is from 50 ppm to 200 ppm.

4. The method of claim 2 wherein the concentration of non-particulate nucleating system is from 100 ppm to 200 ppm.

5. The method of 1 wherein the non-particulate nucleating system consists essentially of one or more aliphatic dicarboxylic acids.

6. The method of claim 5 wherein the aliphatic dicarboxylic acids are selected from the group consisting of succinic acid, glutaric acid, adipic acid, pimelic acid, suberic acid, azelaic acid, undecanedioic acid and dodecanedioic acid.

7. The method of claim 1 wherein the non-particulate nucleating system consists essentially of at least one aliphatic dicarboxylic acid containing from 4 to 21 carbon atoms and at least one aliphatic monocarboxylic acid containing from 8 to 24 carbon atoms in a weight ratio between 4:1 and 1:4.

8. The method of claim 7 wherein the aliphatic monocarboxylic acids are selected from the group consisting of oleic acid, stearic acid, behenic acid, myristic acid, pentadecanoic acid, palmitic acid, margaric acid, abietic acid, lauric acid, linoleic acid, ricinoleic acid, dihydroxystearic acid, arachidic acid, eicosenoic acid, erucic acid, tetracosenoic acid, elaidic acid and mixtures thereof.

9. The method of claim 7 wherein the aliphatic monocarboxylic acids consists of a mixture of stearic acid, palmitic acid, myristic acid, margaric acid, pentadecanoic acid and oleic acid.

10. The method of claim 7 wherein the aliphatic dicarboxylic acids are selected from the group consisting of succinic acid, glutaric acid, adipic acid, pimelic acid, suberic acid, azelaic acid, undecanedioic acid and dodecanedioic acid.

11. The method of claim 7 wherein the monocarboxylic acid is stearic acid and the dicarboxylic acid is adipic acid.

12. The method of claim 7 wherein the dicarboxylic acid is adipic acid and the monocarboxylic acid is a mixture of stearic acid, palmitic acid, myristic acid, margaric acid, pentadecanoic acid and oleic acid.

13. The method of claim 1 wherein said product is a plurality of pellets.

14. The method of claim 1 wherein said product is a powder.

15. The method of claim 2 further comprising the step of processing said composition into a biaxially oriented film by stretching said film in the machine direction and separately stretching said film layer in the transverse direction to produce a biaxially-oriented film.

16. The method of claim 2 further comprising the step of processing said composition into a biaxially oriented film by simultaneously stretching said film in the machine direction and in the transverse direction to produce a biaxially-oriented film.

17. A method of making a biaxially oriented polypropylene film comprising the steps of:
    (a) providing an extrusion grade mini-random polypropylene;
    (b) combining said extrusion grade polypropylene with a non-particulate nucleation system, to form a composition;
    (c) processing said composition into a biaxially oriented film; and
    wherein the concentration of nucleating system is from 25 ppm to 300 ppm.

18. The method of claim 17 wherein the concentration of non-particulate nucleating system is from 50 ppm to 200 ppm.

19. The method of claim 17 wherein the concentration of non-particulate nucleating system is from 100 ppm to 200 ppm.

20. The method of claim 17 wherein the non-particulate nucleating system consists essentially of aliphatic dicarboxylic acids.

21. The method of claim 20 wherein the aliphatic dicarboxylic acids are selected from the group consisting of succinic acid, glutaric acid, adipic acid, pimelic acid, suberic acid, azelaic acid, undecanedioic acid and dodecanedioic acid.

22. The method of claim 17 wherein the non-particulate nucleating system consists essentially of at least one aliphatic dicarboxylic acid containing from 4 to 21 carbon atoms and at least one aliphatic monocarboxylic acid containing from 8 to 24 carbon atoms in a weight ratio between 4:1 and 1:4.

23. The method of claim 22 wherein the aliphatic monocarboxylic acid is selected from the group consisting of oleic acid, stearic acid, behenic acid, myristic acid, pentadecanoic acid, palmitic acid, margaric acid, abietic acid, lauric acid, linoleic acid, ricinoleic acid, dihydroxystearic acid, arachidic acid, eicosenoic acid, erucic acid, tetracosenoic acid, elaidic acid and mixtures thereof.

24. The method of claim 22 wherein the aliphatic monocarboxylic acids consists of a mixture of stearic acid, palmitic acid, myristic acid, margaric acid, pentadecanoic acid and oleic acid.

25. The method of claim 22 wherein the dicarboxylic acid is selected from the group consisting of succinic acid, glutaric acid, adipic acid, pimelic acid, suberic acid, azelaic acid, undecanedioic acid and dodecanedioic acid.

26. The method of claim 22 wherein the monocarboxylic acid is stearic acid and the dicarboxylic acid is adipic acid.

27. The method of claim 22 wherein the dicarboxylic acid is adipic acid and the monocarboxylic acid is a mixture of stearic acid, palmitic acid, myristic acid, margaric acid, pentadecanoic acid and oleic acid.

28. A method of making a biaxially oriented polypropylene film comprising the steps of:

(a) providing an extrusion grade mini-random polypropylene;

(b) combining said extrusion grade polypropylene with a non-particulate nucleation system, to form a composition;

(c) processing said composition into a biaxially oriented film; and wherein the concentration of non-particulate nucleating system is from 25 ppm to 300 ppm and wherein the nucleating system consists essentially of at least one aliphatic dicarboxylic acid containing from 4 to 21 carbon atoms and at least one aliphatic monocarboxylic acid containing from 8 to 24 carbon atoms in a weight ratio between 4:1 and 1:4.

29. The method of claim 28 wherein the monocarboxylic acid is stearic acid and the dicarboxylic acid is adipic acid.

30. The method of claim 28 wherein the dicarboxylic acid is adipic acid and the monocarboxylic acid is a mixture of stearic acid, palmitic acid, myristic acid, margaric acid, pentadecanoic acid and oleic acid.

31. The method of claim 28 wherein the concentration of nucleating system is from 50 ppm to 200 ppm.

32. The method of claim 28 wherein the concentration of nucleating system is from 100 ppm to 200 ppm.

33. A method of making a polypropylene composition useful in the manufacture of biaxially oriented polypropylene film comprising the steps of:

(a) providing an extrusion grade mini-random polypropylene;

(b) combining said extrusion grade polypropylene with a non-particulate nucleation system, to form a composition;

(c) processing said composition into a convenient raw material; and wherein the concentration of non-particulate nucleating system is from 25 ppm to 300 ppm and wherein the nucleating system consists essentially of at least one aliphatic dicarboxylic acid containing from 4 to 21 carbon atoms and at least one aliphatic monocarboxylic acid containing from 8 to 24 carbon atoms in a weight ratio between 4:1 and 1:4.

34. The method of claim 33 wherein the extrusion grade polypropylene and non-particulate nucleation system is further combined with an antioxidant in the amount less than 1% and an acid neutralizer in the amount of less than 1%.

* * * * *